United States Patent Office 3,518,191
Patented June 30, 1970

3,518,191
MODIFIED OLEOPHILIC GRAPHITE AND HEAVY METAL SULPHIDES
Aleksander Groszek, London, Geoffrey Hairsine Bell, Ashford, and Stanley C. Dodson, Staines, England, assignors to The British Petroleum Company Limited, London, England, a corporation of England
No Drawing. Filed Feb. 21, 1968, Ser. No. 707,314
Claims priority, application Great Britain, Feb. 22, 1967, 8,361/67
Int. Cl. C10m 1/36, 1/12, 1/10
U.S. Cl. 252—29    3 Claims

ABSTRACT OF THE DISCLOSURE

A modified oleophilic graphite can be prepared by grinding graphite in an organic liquid in the presence of a polymer.

The modified oleophilic graphites have enhanced grease thickening properties and form harder greases.

---

This invention relates to improved thickeners for lubricating oils and to lubricating compositions containing them. In particular it relates to modified "oleophilic compounds" and to lubricating compositions containing them.

The oleophilic compounds useful in the present invention are oleophilic graphite, oleophilic molybdenum disulphide and other oleophilic metal sulphides such as tungsten sulphide and tin sulphides.

By oleophilic compound is meant a graphite or metal sulphide having a surface area of at least 10 square metres per gram and a ratio of heat of adsorption of n-dotriacontane from n-heptane to the heat of adsorption of n-butanol from n-heptane of at least 1:1.

Preferably oleophilic graphite has a surface area of at least 20 square metres per gram and having a heat of adsorption of n-dotriacontane from n-heptane of at least 700 millicalories per gram and a heat of adsorption of n-butanol of less than 200 millicalories per gram.

The heats of adsorption of n-dotriacontane and n-butanol can be measured using a flow-microcalorimeter as described in Chemistry and Industry, Mar. 20, 1965, pp. 482–489.

It has now been found that, if an oleophilic compound, or a compound which is then converted into an oleophilic compound, is contacted with an adsorbable polymer, a modified oleophilic compound is produced having enhanced grease thickening properties.

The invention provides a method of producing a modified oleophilic compound which comprises contacting an oleophilic compound with an adsorbable polymer or contacting a compound, which is later treated so as to become oleophilic, with an adsorbable polymer.

The adsorbable polymer can be added to the finished oleophilic compound at any stage in its preparations, for example, to the starting material, to the starting material plus grinding liquid, or to the slurry of oleophilic compound plus grinding liquid, displacing liquid or lubricating composition base oil. It is only necessary that it should come into contact with the oleophilic compound at some stage.

The invention also provides modified oleophilic compounds produced by the above method.

The invention further provides lubricating compositions containing the modified oleophilic compound produced by the above method and greases containing the modified oleophilic compound as a thickener.

The term adsorbable polymer refers to a polymer capable of being adsorbed on the surface of the oleophilic compound which has a molecular weight of above 2000. As oleophilic compounds have strong affinity for paraffinic hydrocarbons the preferred polymers contain polymethylene groups, e.g. polyolefins.

The molecular weight of the polymer is preferably above about 2000 and the limiting viscosity number is preferably above 0.1.

More preferably the molecular weight of the polymer is above 10,000 and most preferably the molecular weight of the polymer is above 20,000.

It has been found that, in order to produce harder greases, branched chain polymers are preferred. Examples of suitable branched chain polymers are polyisobutylene, poly-4-methylpentene-1 and copolymers such as 4-methylpentene-1/butene copolymers.

Other polymers which can be used include halogenated polymers such as polytetrafluoroethylene and polyvinylchloride, polyesters, polyethers and polyamides.

The oleophilic compound preferably contains up to 10% by weight of polymer based on the total weight of the compound, and more preferably contains from 2–10% by weight of the polymer.

The term polymer is to be understood to include copolymers.

Oleophilic compounds can be obtained by grinding compounds in most organic liquids but it is desirable to use one the bulk of which can be easily removed from the modified oleophilic compound. Those liquids distilling below 500° C. and having a viscosity below 600 centistokes at 100° F. (38° C.) are therefore preferred. (Liquids having a surface tension below 72 dynes/cm., preferably from 10 to 40 dynes/cm., at 25° C. are preferred.)

Suitable organic liquids are lower molecular weight hydrocarbons, including straight-chain or branched-chain, saturated or unsaturated alkyl compounds, saturated or unsaturated, substituted or unsubstituted, cyclo-alkyl compounds, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of the compound in the compound organic liquid mixture should not exceed 50% wt.; preferably it should be from 2 to 20% wt.

The grinding may be carried out in any suitable grinding mill or device and when the compound is graphite it is desirable to continue the grinding until an oleophilic graphite having a surface area (as determined by nitrogen adsorption) of from 20 to 800, preferably from 30 to 200, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and the compound. A suitable procedure is to fill the mill with the liquid, add half the balls, then the compound and finally the rest of the balls.

Such a grinding procedure might be referred to as a "closed" system.

When using a ball mill, it is of course desirable to use balls made of a material which does not react with the compound and which does not wear unduly during the grinding. Vibratory ball mills usually contain steel balls and these are suitable for the present purpose. It is preferred to use a hard grade of steel for the balls and for the grinding chamber.

A magnetic filter can be used, if desired, to remove small steel particles from the slurry that is produced in the grinding operation. A circulatory system can also be used wherein the slurry is pumped through an external magnetic filter and then returned to the mill. The circulatory system can be run semi-continuously, the slurry being pumped out after the grinding period and fresh material added to the system.

A suitable vibratory ball mill is sold under the trade name "Megapact," manufactured by Pilamec Limited.

As an initial step the slurry of oleophilic compound that is produced in the grinding operation can be separated from the grinding balls by sieving or by displacement of the grinding liquid by another liquid and sieving.

If a relatively high boiling organic liquid is used for grinding it may be desirable to displace this liquid by a low boiling liquid. This liquid can then be removed by boiling. It is preferred to use vigorous boiling.

It is also possible to filter the slurry to obtain a filter cake of the oleophilic compound.

In either case it is preferred to remove the last traces of grinding liquid or displacing liquid by heating the oleophilic compound in a vacuum oven for several hours, for example, at 100° C. and at 1 mm. mercury.

Alternatively and preferably, the grinding liquid or displacing liquid is not removed from the oleophilic compound which remains in the slurry. This course is most preferred if the grinding liquid can also act as a base oil for a lubricating composition.

It is particularly convenient to use an oil-soluble, adsorbable polymer which can be dissolved in the grinding liquid which is added to the starting material. It is also convenient to add an oil-soluble, adsorbable polymer to any displacing liquid or to the base oil for a lubricating composition.

The modified oleophilic compound, like oleophilic graphite, will adsorb n-dotriacontane in preference to n-butanol in contrast to non-oleophilic compounds.

THE BASE OIL

The lubricating base oil may be a mineral oil or a synthetic oil.

Suitable mineral oils are refined mineral oils obtained from petroleum, for example, those having a viscosity at 210° F. within the range from 2 to 50 centistokes, preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols, such as, for example, dioctyl sebacate, dinonyl sebacate, octyl nonyl sebacate, and the corresponding azelates and adipates, liquid diesters of aliphatic dicarboxylic acids and phenols.

GREASE LUBRICATING COMPOSITIONS ACCORDING TO THE INVENTION

The amount of modified oleophilic compound required to thicken the base oil will depend on the nature of the oil and the consistency of grease required. For most purposes an amount up to 50% wt., based on the final grease, will be used. However, it is remarkable that modified oleophilic compounds can thicken oils to provide greases with very useful properties at concentrations as low as from 5 to 20% wt., based on the final grease, and this is the preferred concentration range.

The modified oleophilic compound can be incorporated into a grease by a number of methods. It is preferred to incorporate the modified oleophilic compound into a grease immediately after grinding. However, if the modified oleophilic compound is prepared some time before incorporation into the grease, it is preferred to store the modified oleophilic compound in an air-tight container. It may also be stored as a slurry.

The following are examples of methods by which the grease may be prepared:

(a) The grinding liquid is filtered off from the slurry of modified oleophilic compound produced in the grinding operation. The resulting filter cake is ground by, for example, feeding the cake through a colloid mill, and the resulting powder is stirred into the oil. The grease produced is finished by colloid milling.

(b) The grinding liquid is boiled off rapidly from the slurry of modified oleophilic compound to avoid the formation of a cake, the resulting powder is stirred into the oil and the grease is finished by colloid milling.

(c) Base oil is added to the slurry of the modified oleophilic compound and the grinding liquid distilled off.

(d) Base oil is added to the slurry of the modified oleophilic compound and the mixture circulated through a homogeniser (for example, of the Manton-Gaulin type) so that temperatures up to or exceeding 140° C. are produced. The temperature must be high enough to drive off the grinding liquid.

(e) The grease may also be made directly by grinding the compound in the base oil for the grease. For example, a low surface tension, low boiling point mineral lubricating oil with a viscosity up to 600 centistokes at 100° F. (38° C.) can be used. Elevated temperatures up to 400° C. can be used during the grinding.

Methods (c), (d) and (e) are particularly preferred, In general, the modified oleophilic compounds can be incorporated into the base oil either at ambient temperatures or, if desired, at elevated temperatures, for example, up to 400° C.

As stated above the oil-soluble polymer may be added to the system to contact the compound or oleophilic compound at any suitable point in the operation. For example, method (c) for making the grease may be modified by adding a solution of an oil soluble, adsorbable polymer in the base oil to a slurry of the oleophilic compounds in a grinding liquid.

The greases according to the invention have remarkably high Drop Points. When their drop points are measured according to the IP or ASTM standard methods, they are found to be above 400° C.: such greases are described as "infusible" and are difficult to produce by conventional methods. By using carefully selected base oils, for example, synthetic oils with high oxidation and thermal stability, greases having a unique combination of properties can be produced.

These greases have good oxidation and mechanical stability at temperatures up to about 130° C. to 140° C. when mineral oils are used as the base oils. For temperatures above this range synthetic base oils can be used. Antioxidants may also be used for the more severe operating conditions. Viscosity index improvers, metal deactivators, anti-corrosion agents etc. can also be added to the greases. Load-carrying additives can also be added to the greases according to the invention.

PROPERTIES OF GREASE LUBRICATING COMPOSITIONS ACCORDING TO THE INVENTION

In general, there are two classes of test method for greases. Firstly there are what might be termed "bench tests." Secondly there are tests in specially designed bearing rigs.

It has been found that the greases according to the invention have (when compared with greases thickened by oleophilic compounds which have not been contacted with an adsorbable polymer) superior thickening power as measured by penetration (a bench test). For example, the use of a modified oleophilic graphite resulted in a decrease of about 30 units in the worked penetration of a grease containing this thickener as compared with an unmodified oleophilic graphite-thickened grease containing the same amount of thickener.

This result can be expressed in a different way. Thus,

The base oils used for the dispersions are the same as those used for greases and described above.

The following examples serve to illustrate the invention.

Example 1

The table below gives examples of greases prepared using various modified oleophilic graphites according to the invention as compared with a number of comparison examples of greases prepared using various unmodified oleophilic graphites. The Table also shows the effect of different methods of preparations of the modified oleophilic graphites.

TABLE 1

| | Solvent used for grinding | Method of preparation* | Polymer added during grinding | Graphite in grease, percent weight | Polymer in grease, percent weight | ¼ Scale penetration** unworked | ¼ Scale penetration** worked 60 strokes | Bleed DTD 825, percent weight |
|---|---|---|---|---|---|---|---|---|
| | | | Non-polar: | | | | | |
| 1 | n-Heptane | A | None | 17.5 | | 272 | 290 | 6.1 |
| 2 | do | A | do | 17.5 | | 279 | 290 | |
| 3 | iso-Octane | A | do | 17.5 | | 252 | 276 | 6.3 |
| 4 | do | A | do | 17.5 | | 256 | 268 | |
| 5 | n-Heptane | B | do | 17.5 | | 252 | 276 | 3.6 |
| 6 | do | A | Polyisobutylene [1] | 17.5 | 1.15 | 268 | 272 | 5.3 |
| 7 | do | B | do.[1] | 17.5 | 1.15 | 238 | 252 | 3.9 |
| 8 | iso-Octane | B | do.[1] | 17.5 | 1.15 | 219 | 248 | |
| 9 | n-Heptane | B | do.[1] | 17.5 | 2.3 | 238 | 248 | 4.3 |
| 10 | do | B | Poly-4-MP-1 [2] | 17.5 | 3.45 | 238 | 252 | 3.0 |
| 11 | do | B | do.[2] | 17.5 | 1.15 | 238 | 260 | Nil |
| 12 | iso-Octane | B | do.[2] | 17.5 | 1.15 | 238 | 245 | 0.6 |
| 13 | n-Heptane | B | do.[2] | 17.5 | 1.15 | 219 | 241 | 0.2 |
| 14 | do | B | Dialysis residue [3] | 17.5 | 1.15 | 226 | 245 | 1.0 |
| 15 | do | B | None | 15.0 | | 287 | 313 | |
| 16 | do | B | Polyisobutylene [1] | 15.0 | 1.0 | 264 | 302 | 4.2 |
| 17 | do | B | Poly-4-MP-1 [2] | 15.0 | 1.0 | 272 | 298 | |
| | | | Polar: | | | | | |
| 18 | do | A | Dialysis residue [4] | 17.5 | 1.15 | 264 | 294 | |
| 19 | do | A | do.[4] | 17.5 | 1.15 | 252 | 294 | |
| 20 | do | B | do.[4] | 17.5 | 0.55 | 219 | 238 | 1.9 |
| | | | Non-polar: | | | | | |
| 21 | do | C | Butene/4-MP-1 copolymer.[5] | 17.5 | 0.15 | 248 | 272 | 2.0 |
| 22 | do | C | do.[5] | 17.5 | 0.30 | 230 | 256 | 1.4 |
| 23 | do | C | do.[5] | 17.5 | 0.60 | 223 | 241 | 0.5 |
| 24 | do | C | do.[5] | 17.5 | 1.15 | 211 | 238 | 2.7 |

[1] This polymer had a molecular weight of about 2,800.
[2] These polymers had high molecular weights. The L.V.N.'s were respectively 0.24, 1.24, 1.9, 1.9 and 1.9.
[3] This polymer was the dialysis residue of a high molecular weight polyisobutylene.
[4] This polymer was the dialysis residue of a polymethyl-methacrylate/maleic anhydride/tetraethylene pentamine reaction product.
[5] This was a high molecular weight amorphous copolymer.
*Methods used to prepare greases:
   A. The slurry of oleophilic graphite (or modified oleophilic graphite) and grinding liquid was removed from the grinding tubes, the graphite was dried by distilling off the grinding liquid rapidly and heating the product in a vacuum oven at 0.1 mm. mercury and 100° C. The graphite was then dispersed in the oil using a colloid mill.
   B. The slurry of oleophilic graphite (or modified oleophilic graphite) and grinding liquid was removed from the grinding tubes, the required amount of oil added to the slurry and the grinding liquid removed by distillation at reduced pressure. The resulting grease was then homogenised in a colloid mill.
   C. The slurry of oleophilic graphite and grinding liquid was removed from the grinding tubes, the required amount of oil containing adsorbable polymer added to the slurry and the grinding liquid removed by distillation at reduced pressure. The resulting grease was then homogenised in a colloid mill.
**These penetration values are ¼ scale penetrations converted to full scale readings by the generally accepted correlation established for soap-tickened greases (ASTM D.1403-56T). Due to the different rheological properties of graphite greases these are not exactly the values which would be obtained from a full scale penetration.

a grease with a worked penetration of approximately 290 units was obtainable with a modified oleophilic graphite thickener content of about 15 percent by weight, instead of 17.5 percent for the unmodified oleophilic graphites.

In general, the oil separation properties of greases prepared using modified oleophilic compounds are superior to those prepared using unmodified oleophilic compounds. This improvement is particularly marked when higher molecular weight polymers with a L.V.N. of greater than 1.0 are used to prepare the modified oleophilic graphites. These properties can be demonstrated using a standard Bleed Test, DTD 825 (Ministry of Defense Specification).

DISPERSION LUBRICATING COMPOSITIONS

Modified oleophilic compounds can be incorporated into base oils in quantities up to 10% wt., based on the total weight, to form dispersions with surprisingly good lubricating properties. The dispersions are remarkably stable.

The dispersions can be formed quite simply by stirring the modified oleophilic compound into the base oil. Alternatively, a mechanical aid to dispersion such as a colloid mill can be used. In fact any of the methods of preparation specified above for greases can be used.

It can be seen from the table that greases prepared using modified oleophilic graphites as thickeners have superior properties to greases prepared using unmodified oleophilic graphites. It can be further seen that the polymer used to modify the oleophilic graphites may be non-polar or polar. It can also be seen that the point at which the oleophilic graphite is modified by the polymer is not material. Finally, it can be seen (by inspection of greases 21 to 24) that the improvement conferred by the polymer is not due to a change in the viscosity index of the base oils.

Example 2

Molybdenum disulphide powder 30 g. was ground in 60 g. of heavy medicinal paraffin and 180 g. n-heptane in a 1½ inch diameter 20 inch long tube filled with ⅜ inch case hardened steel balls. The tube of case hardened steel was vibrated 3000 cycles per minute at an amplitude of 4 millimetres. The product was discharged from the tube and the solvent removed from the slurry under vacuum.

This process repeated was as above with the addition of 2.2 percent weight of copolymer from 4-methyl pentene-1 and butene-1.

A second run under conditions identical to those above but with a high molecular weight polymer poly-4-methyl pentene-1 added in place of the copolymer.

The test results on the greases obtained are given in the table below.

TABLE 2

| Solvent used for grinding | Method of preparation | Polymer added during grinding | MoS₂ in grease, percent weight | Polymer in grease, percent weight | ¼ Scale penetration unworked | ¼ Scale penetration worked 60 strokes | Bleed DTD 825 percent weight |
|---|---|---|---|---|---|---|---|
| n-Heptane | B | Copoly-4-methyl pentene-1 | 33.3 | 2.2 | 268 | 313 | 3.0 |
| n-Heptane | B | Poly-4-methylpentene-1 | 33.3 | 2.2 | 234 | 287 | 1.7 |
| n-Heptane | B | None | 33.3 | | 335 | 328 | 4.9 |

What we claim is:

1. A method of producing modified oleophilic compounds which comprises forming a mixture which consists of less than 50% by wt. of a compound selected from heavy metal sulphides and graphite in an organic liquid distilling below 500° C., having a viscosity below 600 centistokes at 38° C., and having a surface tension below 72 dynes/cm. at 25° C., grinding said compound in said liquid until said compound becomes oleophilic and has a surface area of from 10 to 800 sq. meters per gram, adsorbing an effective amount of an organic adsorbable polymer selected from the group consisting of hydrocarbons, polyesters, polyamides, and chlorinated hydrocarbons onto the surface of the oleophilic compound.

2. A modified oleophilic compound produced by the method of claim 1.

3. A lubricating composition consisting of a lubricating oil containing an effective amount of a modified oleophilic compound produced by the method of claim 1.

References Cited

UNITED STATES PATENTS 3,383,311  5/1968  Groszek _____ 252—29
3,384,579  5/1968  Groszek _____ 252—25
3,384,580  5/1968  Peace _____ 252—59

DANIEL E. WYMAN, Primary Examiner

I. VAUGHN, Assistant Examiner

U.S. Cl. X.R.

23—134, 209.1, 209.2; 252—25

PO-1050
(5/69)

UNITED STATES PATENT OFFICE
CERTIFICATE OF CORRECTION

Patent No. 3,513,191　　　　　　　　Dated June 30, 1970

Inventor(s) Aleksander Groszek, Geoffrey Hairsine Bell and
Stanley C. Dodson

It is certified that error appears in the above-identified patent and that said Letters Patent are hereby corrected as shown below:

Column 4, lines 29 & 30, "eleophilic" should read -- oleophilic --;

Column 4, line 41, the second comma appearing after the word "preferred" should be removed and replaced by a period;

Column 4, line 52, "compounds" should read -- compound --; and

Claim 1, line 9, "10" should read -- 20 --.

SIGNED AND
SEALED
JAN 19 1971

(SEAL)
Attest:

Edward M. Fletcher, Jr.
Attesting Officer

WILLIAM E. SCHUYLER, JR.
Commissioner of Patents